W. W. WINEGAR.
APPARATUS FOR HANDLING HORSES.

No. 184,124. Patented Nov. 7, 1876.

WITNESSES:
H. Rydquist
John Goethals

INVENTOR:
W. W. Winegar
BY Munn & Co
ATTORNEYS.

UNITED STATES PATENT OFFICE.

WILLIAM W. WINEGAR, OF CHAMBERSBURG, ILLINOIS.

IMPROVEMENT IN APPARATUS FOR HANDLING HORSES.

Specification forming part of Letters Patent No. 184,124, dated November 7, 1876; application filed September 16, 1876.

*To all whom it may concern:*

Be it known that I, WILLIAM WALLACE WINEGAR, of Chambersburg, in the county of Pike and State of Illinois, have invented a new and Improved Apparatus for Handling Horses and other Animals, of which the following is a specification:

My invention consists of a couple of upright yokes or crotches, together with cords and a tightening device therefor, mounted on a cranked axle of a pair of wheels, in such manner that, by adjusting the axle fore and aft under the body and between the legs of the animal, the cords may be arranged so as to confine him in a web in which he can be turned over on side or back, and can be moved about readily on the wheels.

The contrivance is designed for handling vicious and lame animals for treatment of any kind.

Figure 1:
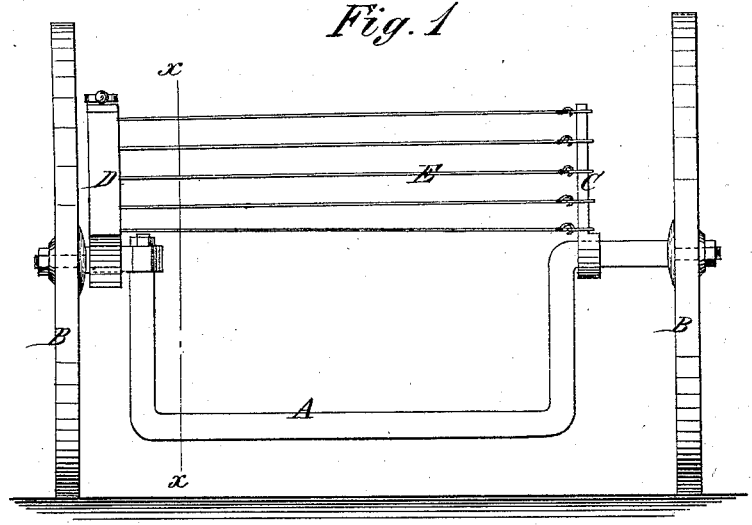
Figure 2:
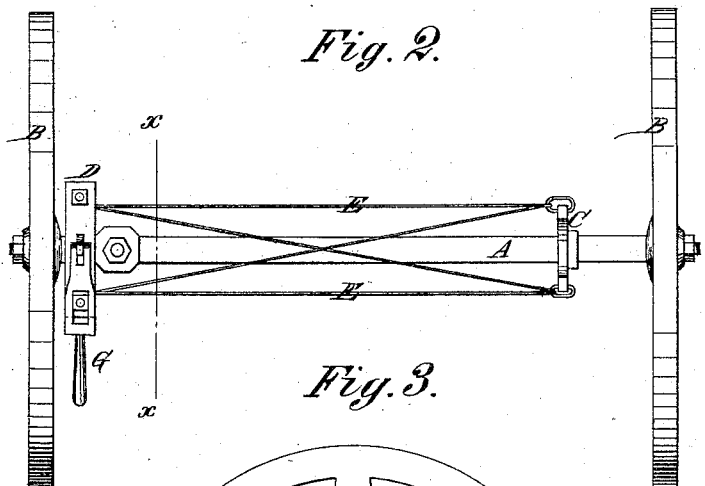
Figure 3:
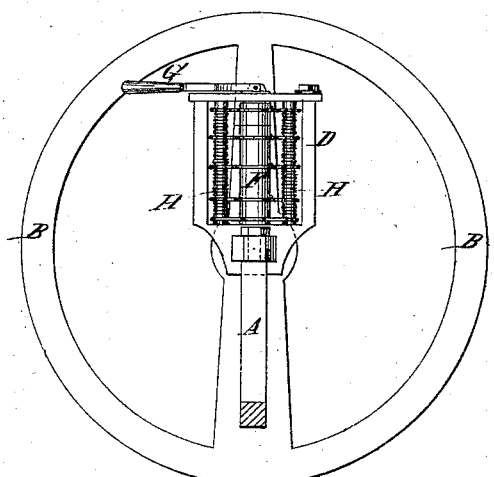

Figure 1 is a side elevation of my improved apparatus. Fig. 2 is a top view, and Fig. 3 is a transverse section on the line $x\,x$ of Fig. 2.

Similar letters of reference indicate corresponding parts.

A represents the cranked axle; B, the wheels for supporting it; C and D, the crotches; E, the cords; F, the tightening-roller; G, the handle for working it, and H guide-rollers for the cords. The cords are made to hook at both ends on the crotch, and pass over guide-rollers and around the tightening-roller of the other crotch, in such manner that when hooked onto crotch C they can be tightened up and loosened at will by turning the roller F.

The crotch C is adjustable along the axle between the crank and the wheel, so as to shift it out of the way when securing an animal, the cords being detached from it to adjust the axle under the animal and between his legs, after which the crotch is shifted back again, and the cords hitched on the crotch, the lower ones crossing under the belly and the upper one crossing over the back, after which they are tightened up by the roller F, so as to firmly secure the body, and the legs are then fastened to the axle, as required, and the head to crotch C. Pads of any kind may be interposed between the cords and the body when needed for the protection of it from the cords. The animal thus secured may be handled at will for any purpose, and may be moved about from place to place on the wheels.

Having thus described my invention, I claim as new and desire to secure by Letters Patent—

The combination of the crotches C D, cords E, and a tightening device, F, with the cranked axle and wheels, substantially as specified.

WILLIAM WALLACE WINEGAR.

Witnesses:
 JOHN LAW,
 JOHN WINEGAR.